United States Patent [19]

Desiro

[11] Patent Number: 4,823,455
[45] Date of Patent: Apr. 25, 1989

[54] RADIATOR CRIMPING AND DECRIMPING TOOLS

[76] Inventor: Richard A. Desiro, 42995 Ambridge, Northville, Mich. 48167

[21] Appl. No.: 156,756

[22] Filed: Feb. 18, 1988

Related U.S. Application Data

[60] Continuation-in-part of Ser. No. 32,965, Apr. 1, 1987, Pat. No. 4,769,888, which is a division of Ser. No. 268,551, Jun. 1, 1981, Pat. No. 4,411,414.

[51] Int. Cl.$^4$ .............................................. B23P 11/00
[52] U.S. Cl. ...................................... 29/243.5; 72/384
[58] Field of Search ................. 72/479, 459, 458, 384; 29/243.5

[56] References Cited

U.S. PATENT DOCUMENTS

| | | | |
|---|---|---|---|
| 1,486,484 | 3/1924 | Fischer | 72/384 |
| 3,961,518 | 6/1976 | Osbolt | 72/409 |
| 4,116,034 | 9/1978 | Ruediger | 72/458 |
| 4,614,106 | 9/1986 | Forget | 72/384 |

FOREIGN PATENT DOCUMENTS 2035168  6/1980  United Kingdom ................. 29/727

Primary Examiner—John K. Corbin
Assistant Examiner—R. D. Shafer
Attorney, Agent, or Firm—Remy J. VanOphem

[57] ABSTRACT

Fixturing for repair of automobile radiators is disclosed, usable for recoring of either brass or plastic tank radiators, including clamping gates providing first and second sets of parallel side rails adjustably spaced to receive a radiator header with a pneumatic cylinder exerting clamping pressure on the tank top. The radiator sits atop the first set of side rails when resoldering conventional tanks and is recessed between the second set of side rails which are alternatively installed for decrimping and crimping of the header tabs of plastic tank radiators. Crimping and decrimping hand tools of special configuration are disclosed which cooperate with the second set of side rails to permit single handed operation.

7 Claims, 6 Drawing Sheets

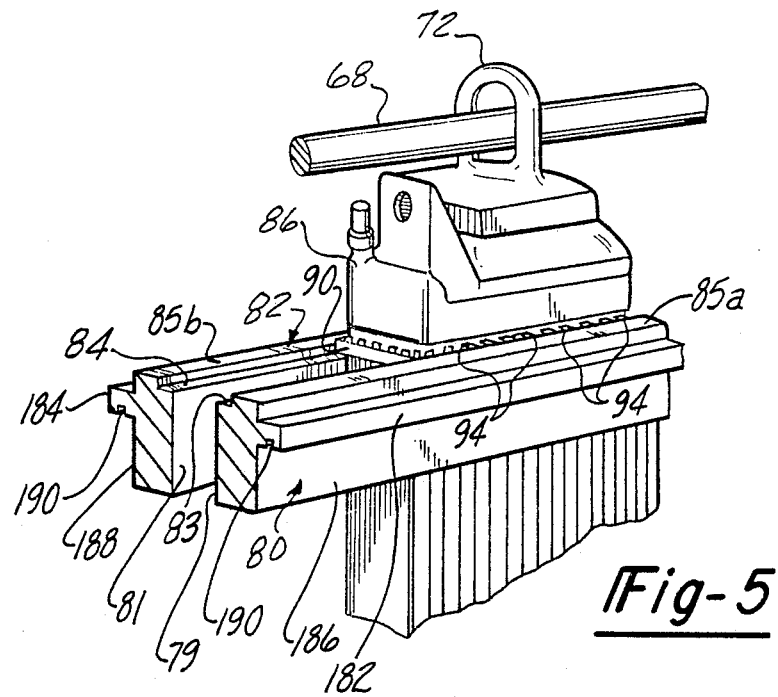
*Fig-5*
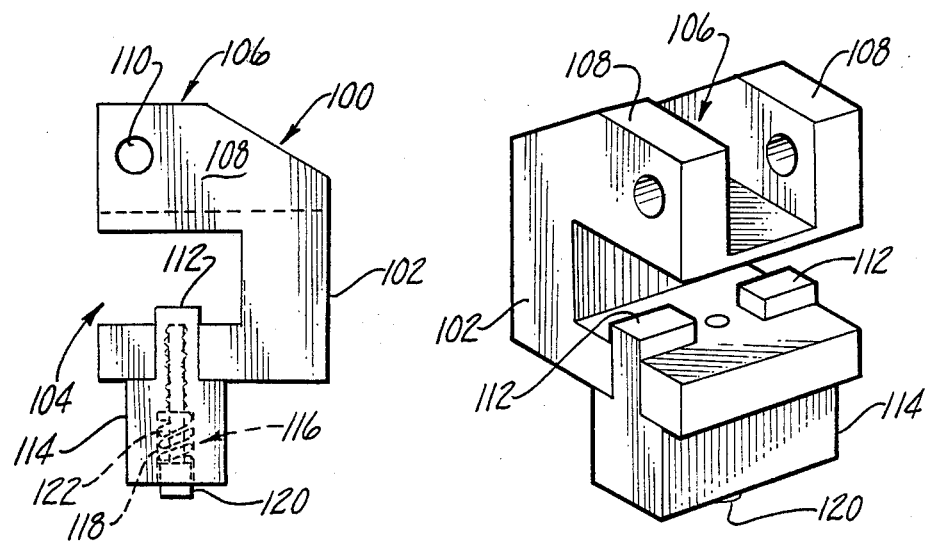
*Fig-6*           *Fig-7*

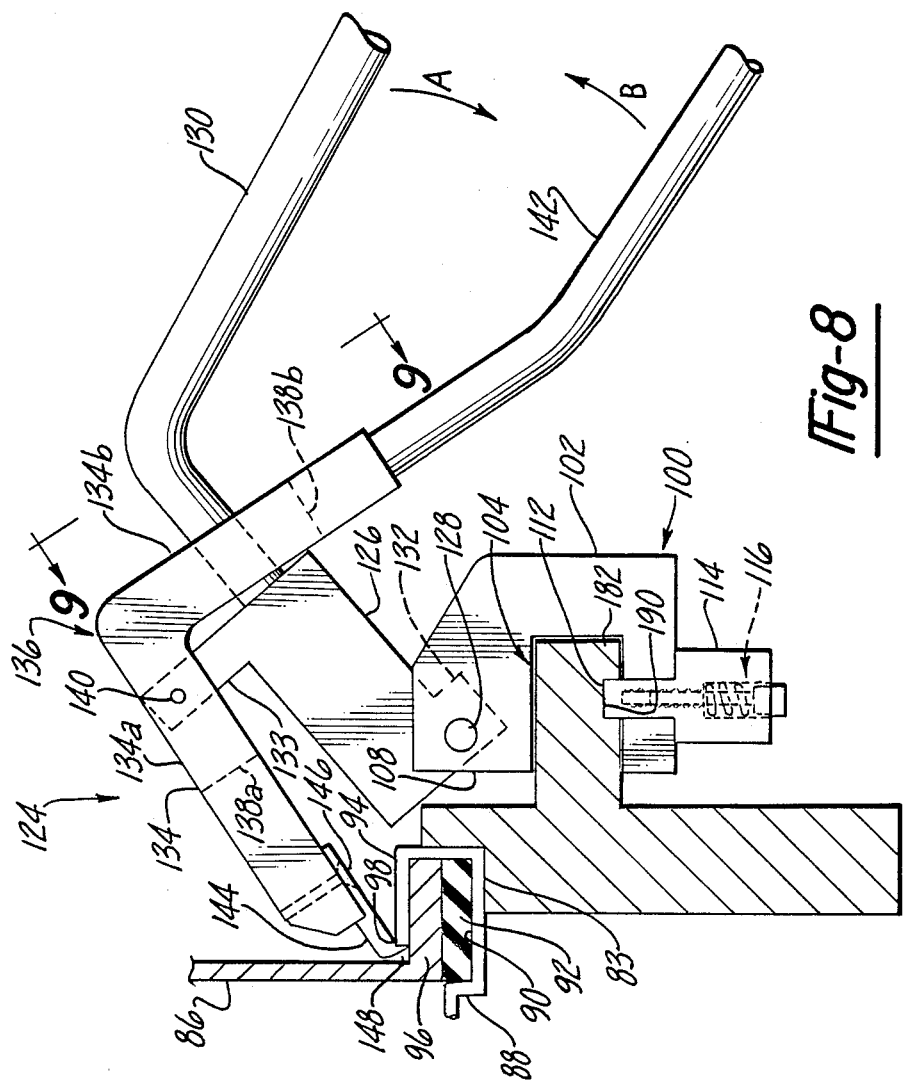

RADIATOR CRIMPING AND DECRIMPING TOOLS

CROSS-REFERENCE TO RELATED APPLICATIONS

This application is a continuation-in-part of my copending application Ser. No. 032,965 filed Apr. 1, 1987 now U.S. Pat. No. 4,769,888, which is a division of Ser. No. 268,551 filed June 1, 1981, now U.S. Pat. No. 4,411,414.

BACKGROUND OF THE INVENTION

1. FIELD OF THE INVENTION

This invention pertains to the repair of internal combustion engine coolant radiators and more particularly concerns fixturing and hand tools for recoring of such radiators.

2. DESCRIPTION OF THE PRIOR ART

In the course of repairing such radiators, recoring is often found to be necessary in which the tube-and-fin "core" of the radiator is removed from the top and bottom tanks. Conventional radiator construction includes a tank joined to the core in which a header receives the core tubes and forms the bottom of the tank when the tank is mounted within the header. The most common radiator construction currently employed includes a brass tank which is soldered to the header. In recoring the radiator, the soldered joint is loosened for removal of the tank, and upon recoring, the tank is placed into the header and the solder connection rerun.

Recently there has developed a trend towards replacement of the brass tank with a plastic tank which is mechanically joined to the header. The plastic tank is positioned against a gasket in order to seal the plastic tank to the header. The plastic tank is secured in position with a series of tabs formed integrally with the header, which are bent down onto the tank flange to retain the plastic tank compressed against the gasket.

Radiator repair shops have for the most part relied on impromptu fixturing for conducting these operations.

Reassembly of the brass tank to the header has often involved difficulties due to deformation of the tank bottom or slight irregularities in the header recess receiving the tank lip, such that a degree of pressure is necessary in order to get the tank to properly seat. In addition, there sometimes exists excessive clearance between the tank lip and the header tank recess, which in turn results in a weaker solder joint. The handling of the disassembly and reassembly of the tank and radiator core and header is relatively difficult and slows completion of the recoring.

Plastic tank designs have presented their own peculiar problems in recoring, particularly in crimping and decrimping of the tabs while properly ensuring a seal of the plastic tank bottom against the gasket and the header.

The crimped tabs are difficult to loosen because they are often jammed tightly into the tank flange, with minimal clearance between the plastic tank side wall and the tab end, making it difficult to obtain insertion of a tool for decrimping. The compression of the tank flange against the gasket further aggravates the problem due to the tightness with which the tabs are consequently forced against the tank flange.

Obtaining a proper seal between the header and the plastic tank is also troublesome since, if the header recess receiving the gasket is deformed, leakage will occur. Such deforming can be inflicted by the decrimping operation or the subsequent crimping operation due to pressure exerted by hand tools on the outer edge of the header.

In addition, the entire tank crimping and decrimping operations are relatively time consuming, resulting in a high cost of labor to recore a radiator.

Plastic tanks are, in the United States, only now beginning to be found in numbers but, ultimately, may account for the bulk of radiator repairs. In the interim, both types of radiators will necessarily need to be accommodated. Since fixturing therefor is relatively costly, it represents a sizeable capital investment for businesses having the limited financial resources of a typical radiator repair shop, and it is important that any fixturing intended for that application be adaptable to both types of tanks.

Frequently, radiator shops have accommodated plastic tanks by using decrimping and crimping tools which have either been conventional hand tools, such as vise grips pressed into service for this purpose, or have been specially designed pneumatic tools. In the case of conventional hand tools, these do not efficiently perform the crimping and decrimping operations and, therefore, require excessive labor. The pneumatic tools, on the other hand, are relatively expensive and are difficult to control, often applying excessive force to the tab due to a lack of "feel" associated with their manipulation.

A solution to the dilemma faced by radiator shop operators is provided by my U.S. Pat. No. 4,462,146 which provides a radiator recoring fixture as well as tools therefor for both conventional brass and plastic tank radiators. In that patent, a fixture is disclosed having a pair of clamping gates each of which is provided with parallel side rails that are adjustably spaced to receive a radiator header. The fixture further includes a pair of hold down elements, which, in cooperation with a clamping bar, press the header onto the side rails by a pneumatically operated cylinder. When a conventional brass tank radiator is being recored, it is placed between a first set of side rails in a position so that its header sits atop the side rails. When a plastic tank radiator is being recored, it is placed between a second set of side rails. Each of the side rails of the second set of side rails has a slot running along its inside, facing corners; the header is placed into the slot formed in the top on each of these side rails. To secure crimping and decrimping of the tabs on the header, a crimping tool and a decrimping tool are respectively provided which cooperate with the second set of side rails.

The decrimping tool consists of a bar section with a handle at one end extending from one side thereof. The bar section is formed with a slot for receiving a pivotable trigger rod. The opposite end of the bar section is formed with an oppositely extending anchor block, which has a throughbore for receiving a spring loaded plunger. The spring loaded plunger has one end engaged with the trigger rod so that it is caused to be extended forwardly of the anchor block. The anchor block is also formed with an inclined mounting surface to which is mounted a downwardly extending hook finger. A knob is also mounted atop the anchor block. In use, the decrimping tool plunger is positioned against one of the rails, the hook finger being in registry with the tab to be decrimped, such that the finger is inserted behind the tab and at the tank side. The hook finger is held down in this position by pressure being applied on the knob. Squeezing of the trigger rod and extension of the plunger produces outward pressure between the finger and the tab, resulting in a pivoting movement of the decrimping tool which enables ready bending upwardly of each of the tabs.

The crimping tool consists of a handle frame to which is joined an angled clevis. The angled clevis, in turn, is pivotally mounted to a swing bar which is affixed to a finger lever. The finger lever includes a rearwardly extending lever rod and forwardly extending finger. A channel block is mounted across the ends of the clevis and is structured to interlock with the slot at the bottom of the rail. In use, the tool is positioned with a crimping finger in registry with a tab to be crimped, the lever rod is then manipulated downwardly while the handle is pulled upwardly to rotate the tool with respect to the rail, causing neat rolling over of the tab into the crimped position.

While my U.S. Pat. No. 4,462,146 has solved many of the problems described above, the crimping and decrimping tools described therein are somewhat awkward to use and require too much attention by the repairman to ensure proper operation. Further, the aforesaid crimping and decrimping tools require both hands of the repairman during operation, which tends to slow down how quickly the operations can be performed as compared to the rapidity of operation if only one hand was necessary therefor.

Accordingly, there remains in the art the need to provide a crimping and decrimping tool, each of which cooperates with a set of side rails, so that only one-handed operation is required in a manner that is easily, smoothly and quickly executed by the repairman.

SUMMARY OF THE INVENTION

The present invention is a fixturing essentially consisting of first and second sets of adjustably mounted rails which are of two differing configurations, one being for conventional tank radiators and the other being for plastic tank radiators, respectively. The rails receive the radiator header, with an air cylinder hold down arrangement being used to exert pressure on the top of the tank in both the conventional and plastic tank applications. In the conventional tank construction, the rails are configured such that the radiator header sits atop each side rail, while in the plastic tank configuration, a recess is provided for the header to be received thereinto at a position roughly even with the top surface of the rails, in order to provide protection for the header seal channel and to cooperate with crimping and decrimping hand tools that are a part of the present invention.

The pairs of rails are supported by pairs of pivoted arms downwardly extending from a cross member to form clamping gates, swingably mounted for movement toward and away from each other so as to be adjustable to radiator headers of varying widths. Mounted atop the cross member is an air cylinder having a downwardly extending operating rod to which is pinned a cross bar slidably receiving a pair of T-shaped hold down elements, each of the hold down elements being slidably received on the cross bar via elongated openings which accommodate tilting as well as sliding movements thereof. Each of the hold down elements is adapted to be positioned at longitudinally spaced points atop the radiator tank when the radiator is located on the rails, in order to secure the radiator in position.

The entire assembly of the rails, arms, cross member and air cylinder ma be mounted for rotation by means of a bearing assembly to allow the radiator, when clamped in place, to be pivoted for ready access by a repairman to all sides of the radiator. For this purpose, the assembly is mounted from above by a cantilevered beam supported on an upstanding frame section for supporting the radiator above the shop floor at a convenient height.

For conventional brass tanks, the header sits atop each rail of a first set of rails and the hold down elements are positioned to exert a pressure on the tank top. Upon actuation of the air cylinder, this pressure forces the tank lower edge or lip into a receiving header recess. The air cylinder pressure further causes the header lip to compress slightly about the edge to reduce the clearance space and improve the soldered connection.

For plastic tanks, the first set of clamping gates are replaced with a second set having a second set of rails, each being formed with a shoulder recess extending along the adjacent sides and top corner thereof. The shoulder recess is receivable to the radiator header, such that the tank flange is roughly even with top of the rails when it is seated therein. The air cylinder and hold down fixtures compress the tank against the gasket and enable ready decrimping of the tabs forming a part of the header.

Each of the side rails of the second set of side rails further has a generally rectangular projection on its outer facing side walls. The generally rectangular projection has a slot which runs along its length.

Both the crimping tool and the decrimping tool utilize a common base. The base has a U-shaped portion which is structured to receive the generally rectangular projection on the side rails. The base has a retaining member which is resiliently biased to project into the cavity formed by the U-shaped portion thereof. The retaining member further is structured to be selectively received by the slot in the side rails. The base further has a clevis for attaching the aforesaid tools thereto.

The decrimping tool has a primary block to which is attached a handle. The primary block is rotatably attached to the clevis of the aforesaid base. The decrimping tool further has a secondary block to which is attached a handle. The secondary block is pivotally attached to the primary block. The secondary block has at one end a hook finger. In operation, the base is placed onto one of the rails by retracting the retaining member so that the projection may be removed from the cavity formed by the U-shaped portion of the base. Thereafter, the retaining member is released so that it inserts into the slot, thereby locking the base onto the rail fixedly in all directions except slidably along the rail. The decrimping tool is then slid to a position so that the hook finger is immediately adjacent to the tip of the tab to be decrimped. The repairman thereupon grabs both handles of the decrimping tool by one hand and rotates the primary block while simultaneously squeezing the handle of the secondary block. The resulting combined pivoting and translational movement of the finger hook causes the tab to be easily and simply bent to an upstanding position.

The crimping tool has a main block which is attached to a handle. The main block is rotatably attached to the clevis of the aforesaid base. The crimping tool further has a crimping finger which is pivotably attached at one end to the main block. The other end of the crimping finger has a crimping edge. A crimp edge adjusting member is provided to allow height adjustment of the crimping edge in relation to the tab. In operation, the base is secured to one of the side rails in the manner hereinabove described. Thereafter, the crimping tool is positioned and adjusted so that the crimping edge abuts the tip of an upstanding tab to be crimped. A simple rotational movement of the handle toward the header causes the tab to be easily secured in a crimped relation to the header.

Accordingly, it is an object of the present invention to provide fixturing for recoring of radiators which is adaptable to both conventional and plastic tank construction and which further is adaptable to the wide variety of radiator tank sizes and configurations that exist such that a simple universal fixture can be employed to be useful in recoring radiators of all types.

A further object of the present invention is to provide such fixturing which greatly facilitates the recoring operation of both metal and plastic tank radiator construction.

It is still another object of the present invention to provide decrimping and crimping hand tools for use with the fixturing in order to efficiently and rapidly conduct the crimping and decrimping steps incidental to recoring of the plastic tanks.

BRIEF DESCRIPTION OF THE DRAWINGS

FIG. 5 is an enlarged fragmentary view of the rail and hold down elements showing a plastic tank therein;

FIG. 6 is a side view of the crimping and decrimping tool base according to the present invention;

FIG. 7 is a perspective view of the crimping and decrimping tool base of FIG. 6;

FIG. 8 is a side view of the decrimping tool according to the present invention shown in use before decrimping a tab;

FIG. 9 is an end view of the decrimping tool taken along lines 9—9 of FIGS. 8.

DETAILED DESCRIPTION OF THE PREFERRED EMBODIMENT

Figure 1:
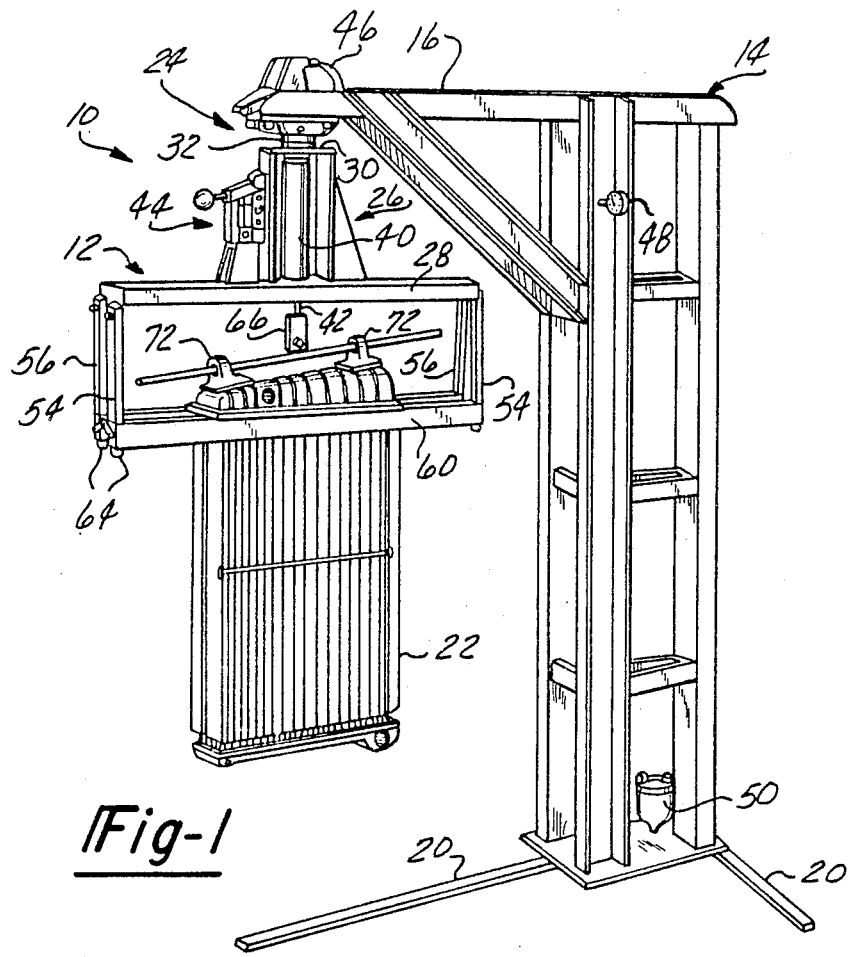
FIG. 1 is a perspective view of the fixturing according to the present invention.

Referring now to the drawings and particularly FIG. 1, a fixturing device 10 according to the present invention includes a clamping assembly 12 suspended from a support frame 14 as well as a cantilevered beam 16 extending outwardly from an upright framework structured to be stably supported on a shop floor surface by outriggers 20. The clamping assembly 12 in this embodiment is designed to be rotatably mounted on the cantilevered beam 16 such as to enable ready access on all sides to a radiator 22 to be recored.

The clamping fixturing includes a support bracket 26 welded to a cross beam 28. The support bracket 26 includes a top plate 30 and a collar 32 integral with a trunnion shaft 34. A retaining collar 36 acts to suspend the clamping assembly 12 on a bearing assembly 24.

Figure 1A:
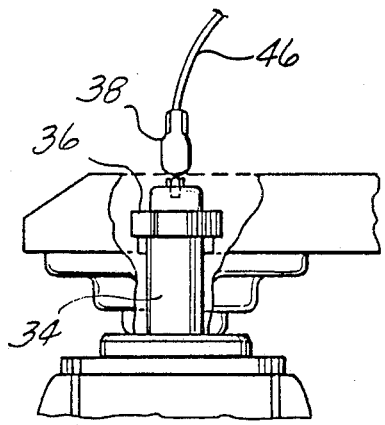
FIG. 1a is an enlarged, fragmentary and partially broken away view of a portion of the clamping fixturing shown in FIG. 1.

A suitable pneumatic swivel 38, shown in FIG. 1a, , is provided allowing connection of pneumatic lines 46 to a pneumatic cylinder 40.

The pneumatic cylinder 40 is mounted between the sides of the support bracket 26, as shown in FIG. 1, and atop the cross beam 28, with an actuating rod 42 extending through an opening in the cross beam 28 such as to extend therebelow. Control means 44 are also mounted to the support bracket 26 enabling selective actuation of the pneumatic cylinder 40 for controlling up, down or neutral motion of the actuating rod. The pneumatic cylinder 40 is supplied with air pressure via the pneumatic line 46 connected to a suitable pressure gauge 48 and a regulator, filter, and lubricator 50.

Figure 3:
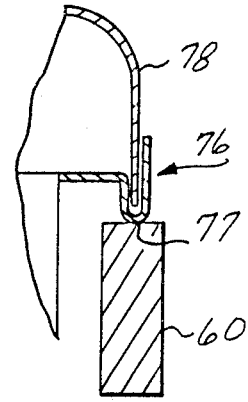
FIG. 3 is a fragmentary side view of the fixturing shown in FIGS. 1 and 2 with the radiator positioned therein.

The clamping assembly 12 also includes a pair of clamping gates 51 and 52 each swingably and detachably mounted on the cross beam 28 by pairs of downwardly extending arms 54 and 56, respectively, pivoted on either end of the cross beam 28 with cap screws 58. Each of the clamping gates 51 and 52 also includes parallel side rails 60 and 62, respectively, connected to the lower ends of the arms 54 and 56 by means of cap screws or bolts 64. The adjacent surfaces of the side rails 60 and 62 are squared off so as to ensure that header edges 76 will securely sit atop the side rails 60 and 62, as shown in FIG. 3.

Figure 2:
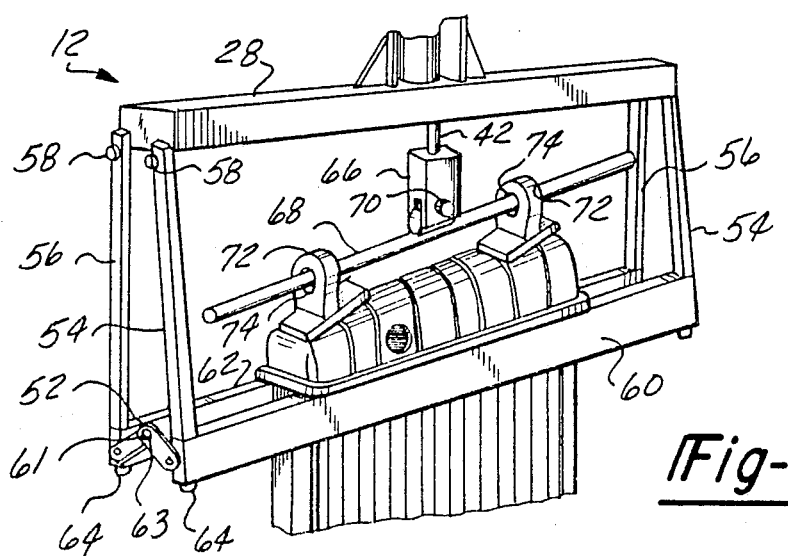
FIG. 2 is an enlarged view of the clamping fixture with a conventional radiator clamped in position.

A clevis end 66 is provided for the actuating rod 42, which, in turn, is held by a pin 70 to a clamping bar 68, as shown in FIG. 2. The clamping bar 68 has slidably disposed thereon a pair of hold down elements 72, each of which has an elongated opening 74 through which the clamping bar 68 passes. The elongation of the clamping bar allows tilting movement, as can best be seen in FIG. 2, to accommodate the many variations of surface contours among differing models of radiators to be disposed thereon.

Hence, what is provided is an extremely efficient and adaptable clamping arrangement which does not require separate fixturing for each of the great number of variations in tank top contours. In addition, the disposition of the radiator 22 between the side rails 60 and 62, which are adjustably mounted for movement towards and away from each other, allows for accommodation of differing widths and depths of radiators, such as to constitute a "universal" fixture arrangement.

In order to secure the clamping gates 51 and 52 in adjusted positions, a toggle linkage 61 is pivotally mounted to each side rail 60 and 62, and are pivotally mounted to each other with an adjustment bolt 63, tightening of which will maintain an adjusted position. This enables adjustment of the side rail positions to accommodate the various radiator widths, thereby correctly positioning the top surface of each of the side rails 60 and 62 relative to a conventional tank header. As can best be seen in FIG. 3, the lower edge 77 of the header edge 76 is positioned atop the rail 60. Thereafter, the control means 44 is actuated to cause the pneumatic cylinder 40 to be pressurized, forcing the hold down elements 72 against a top of the tank 78.

In operation, a new core and header is positioned between the side rails 60 and 62, with the arms 54 and 56 swung into the correct position such that the header lower edge 77 sits atop either side rail 60 or 62. The tank is positioned with the header lower edge 77 above the receiving recess formed by the outer lip of the header edge 76, as shown.

The control means is then actuated such that the pneumatic cylinder 40 is pressurized, forcing the hold down elements 72 to force the tank 78 downward into the recess formed by the outer lip of the header edge 76. This overcomes any tendency for slight irregularities of contour to prevent reinsertion of the tank 78, with the uniform pressure exerted by the arrangement tending to provide excellent seating of the tank onto the header. Further, the pressure also tends to draw the header and tank bottom edge into closer juxtaposition to reduce the clearance space and enable better solder connections to be made.

Figure 4:
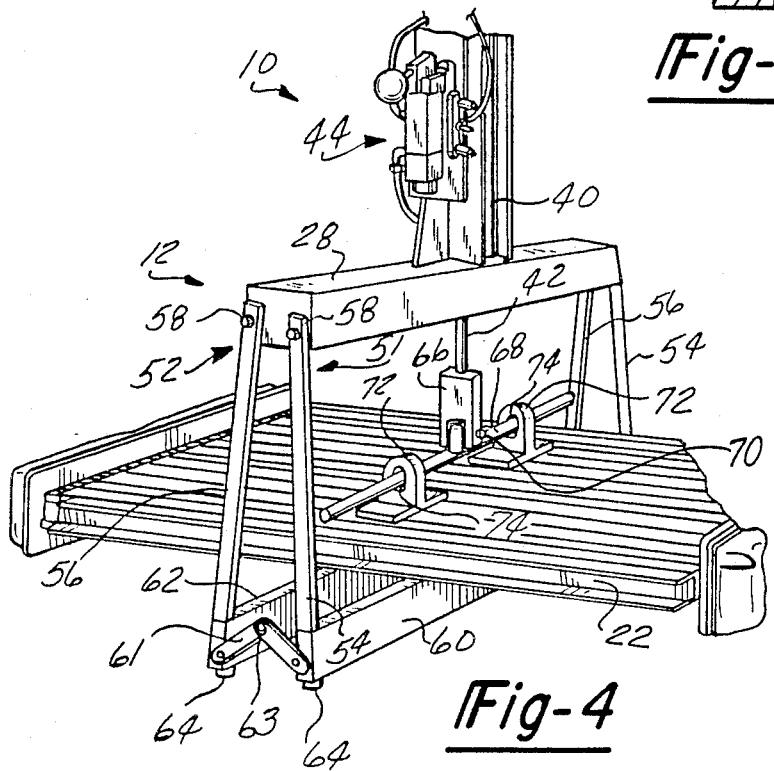
FIG. 4 is an enlarged partial perspective view of the rail and radiator tank and header depicting the relationship of the tank, header and rail configuration adapted for recoring of brass tank radiators.

The level of air pressure is adjustable by means of the regulator 50. The soldered joint may conveniently be made from one side by rotation of the radiator in the fixture through 360° to greatly enhance the workman's efficiency in executing this step. As seen in FIG. 4, the fixturing may also be advantageously employed to make the inlet and outlet soldered connections, by positioning the radiator on its face over the side rails 60 and 62 and actuating the pneumatic cylinder 40 to hold the radiator securely.

It is noted that soldering flux is corrosive to aluminum yet adhesion of the solder to the rails must be avoided in order that the header is not soldered to the side rails 60 and 62. Thus, the side rails 60 and 62 are preferably constructed of stainless steel.

For this same reason, the same side rails 60 and 62 are not suitable for use with both brass tank and plastic tank radiators, since the latter commonly employ aluminum headers. Also, the recessed construction of the rails to be employed for the plastic tanks, as will be described below, is not suitable for use with the soldered connection tanks.

In order to convert the aforesaid fixturing to use with plastic tank radiators, the first set of side rails 60 and 62 are replaced with a second set of side rails 80 and 82, hereinafter referred to as simply side rails 80 and 82. The side rails 80 and 82 have a mutually facing surface 79 and 81, respectively, a top surface 85a and 85b respectively and an outfacing surface 186 and 188, respectively. The side rails 80 and 82 further have a shouldered recess 83 and 84, respectively, which runs along the line of the side rails 80 and 82 formed at the juxtaposition of the mutually facing surface with the top surface of each side rail, respectively.

As can be seen from FIG. 8, a radiator header 88 has a seal channel 90 which is used to seat a gasket 92. The seal channel has at one end a plurality of tabs 94. Further, a plastic tank 86 has a flange 96 which sits on the gasket and is sealed thereto by action of the crimping of the tabs. The header 88 is disposed between the side rails 80 and 82 so that the seal channel 90 on each side of the header 88 is received by one of the shouldered recesses 83 and 84 and the ends of the seal channel 90, and the tabs 94 begin just above the shouldered recesses.

To disassemble the plastic tank radiator, the plastic tank 86 is engaged by the hold down elements 72 above the pneumatic cylinder 40. The hold down elements are actuated to create a downward pressure on the tank upper surface. This compresses the gasket 92 normally included in plastic tank designs and enables the tabs 94 which are in the crimped position to be more readily decrimped by relieving the pressure on the tabs 94 as well as producing clearance between the tip 98 of the tab 94 and the tank flange 96. The positioning of the header seal channel 90 within the shouldered recesses 83 and 84 with the pressure applied to the tank 86, ensures that the tabs 94 can be decrimped with minimal possibilities of producing deformation or distortion of the header seal channel 90. In connection therewith, it is noted that the radiator construction in such plastic tank radiators includes the gasket 92 disposed within the header seal channel 90 and proper sealing thereof depends critically on the undistorted state of the header seal channel.

Figure 10:
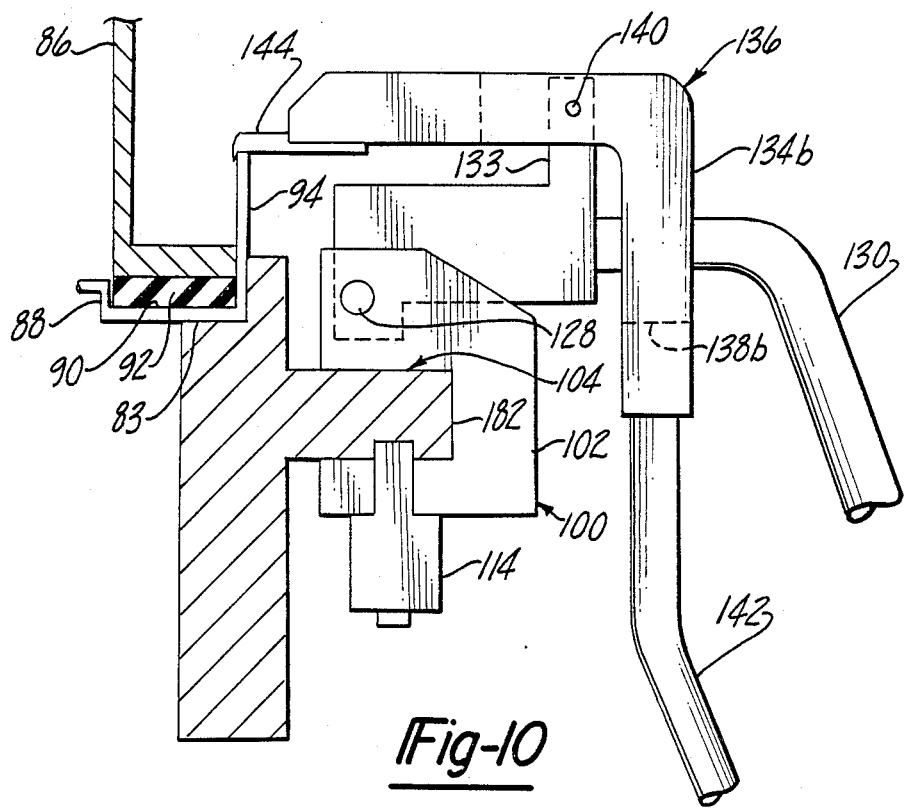
FIG. 10 is a side view of the decrimping tool of FIG. 8 shown in use after decrimping a tab.

Crimping and decrimping is executed by specially designed tools which engage the side rails, one at a time. FIGS. 6 and 7 particularly illustrate the base used in both the crimping and decrimping tools. FIGS. 8 through 10 illustrate the decrimping tool and FIGS. 11 and 12 illustrate the crimping tool.

Referring now to FIGS. 6 and 7, a base 100 is composed generally of a U-shaped portion 102 forming a generally rectangularly shaped cavity 104. A base clevis 106 is formed at one side of the U-shaped portion and is made of two parallel projection members 108. The parallel projection members have an aperture 110 which forms a pivot for the crimping and decrimping tools, as will be discussed following. Within the cavity 104 is a retaining member 112, shown in FIG. 7 as having two projecting members. The retaining members are connected to a retaining block 114 which depends from the U-shaped portion of the base. The retaining block is reciprocably mounted to the U-shaped portion and is resiliently biased so that the retaining member is retractably inserted within the cavity 104. The retractability feature of the retaining member is provided by a biasing mechanism 116. The biasing mechanism is composed of a bore 118 in the retaining block 114 which accommodates a fastener 120 which, in turn, is secured to the U-shaped portion 102. A spring 122 is trapped between the head of the fastener 120 and the end of the bore 118.

Referring now to FIGS. 8 through 10, a decrimping tool 124 is composed of the aforesaid base 100 as well as a primary block 126 and a secondary block 134. The primary block 126 is pivotably connected at one end to the base 100 by a pin 128 passing through the apertures 110 in the base. The primary block has a handle 130 attached to the other end thereof. The primary block 126 is substantially rectangular, but has a base pivot pedestal 132 for facilitating the aforesaid attachment to the base, as well as an oppositely directed secondary block pedestal 133 located adjacent the handle 130. The secondary block 134 is composed of a first portion 134a and a second portion 134b, each at right angles to the other. At the juxtaposition 136 of the first and second portions 134a and 134b, a channel 138 is formed, the extent of which is illustrated by phantom lines 138a and 138b in FIG. 8. The handle 130 of the primary block 126 passes through the channel 138, as does the secondary block pedestal block 133. The channel and the secondary block pedestal are provided with an aligned aperture through which a pin 140 is inserted. The pin 140 provides a pivot point for the secondary block 134 relative to the primary block 126. When the secondary block pivots, the handle 130 is able to move without interference within the channel 138. The end of the second portion 134b of the secondary block 134 has a handle 142 attached thereto. The end of the first portion 134a of the secondary block 134 has a hook finger 144 attached thereto by a threaded fastener 146. The hook finger is provided with a hook edge 148 which is used to decrimp a tab 94 at its tip 98.

Figure 12:
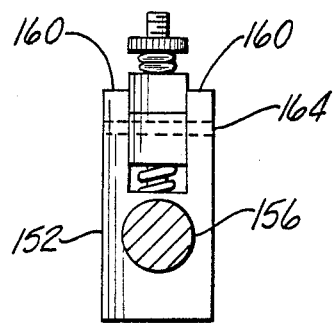
FIG. 12 is an end view of the crimping tool along lines 12—12 in FIG. 11.
Figure 11:
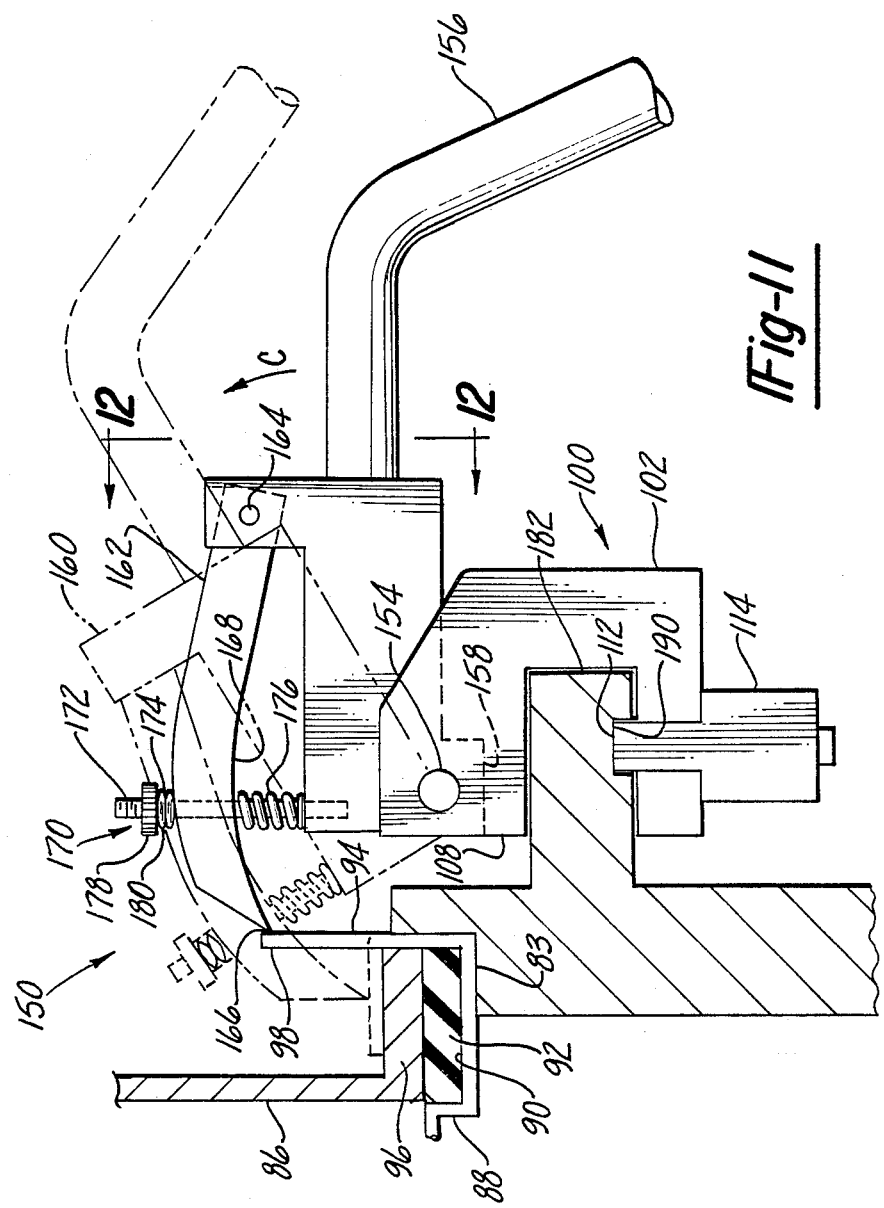
FIG. 11 is a side view of the crimping tool according to the present invention shown in use.

Referring now to FIGS. 11 and 12, a crimping tool 150 is composed of the aforesaid base as well as a main block 152 which is pivotably attached to a crimping finger 162. The main block 152 is pivotably connected at one end to the base 100 by a pin 154 passing through the apertures 110 in the base. The main block has a handle 156 attached to the other end thereof. The main block 152 is substantially rectangular, but has a base pivot pedestal 158 for facilitating the aforesaid attachment to the base, as well as an oppositely directed crimping finger clevis 160. The crimping finger 162 is pivotably attached at one end to the crimping finger clevis by a pin 164 which passes through aligned apertures in the crimping finger clevis and the crimping finger. The other end of the crimping finger has a crimp edge 166 for abutting a tab 94. The crimping finger 162 has a gentle concave curve 168 relative to the main block and the crimp edge is held in a fixed relationship to the main block by an adjuster member 170. The adjuster member is composed of a threaded rod 172 which is secured to the main block 152, an aperture 174 in the crimping finger through which the threaded rod passes, a spring 176 trapped between the main block and the crimping finger which biases the crimping finger away from the main block, and a knurled knob 178 which screws on the threaded rod and controls the position of the crimping finger as it is rotated, the rotation of which is facilitated by washers 180.

The structural interrelationship between the base 100 and the side rails 80 and 82 will now be more particularly discussed. As can be seen by referring to FIG. 5 each of the said rails 80 and 82 have a substantially rectangular rail projection member 182 and 184, respectively, running along the respective outfacing side walls 186 and 188. As can be understood from FIGS. 8 and 11, each of the rail projection members 182 and 184 is structured to snugly fit within the substantially rectangular cavity 104 of the U-shaped portion 102 of the base 100. Further, each of the rail projection members 182 and 184 has a slot 190 running along their length which is structured to permit the retaining members 112 of the base 100 to insert snugly therein.

Operation of the tools hereinabove disclosed for crimping and decrimping operations is as follows. In both the crimping and decrimping operations, the base 100 is mounted on any one of the rail projection members by grasping the tool in one hand and then pulling on the retaining block 114 with the other hand, so that the retaining member 112 is retracted. Retraction of the retaining member allows the base 100 to be placed laterally onto the side rail so that the rail projection member is received into the cavity 104 in the U-shaped portion of the base. Once this is completed, the retaining block is released, permitting the retaining member to erupt into the slot 190 in the rail projection member under urging of the biasing mechanism 116. It is to be understood that the complementary surfaces of the cavity 104 and the rail projection members 182 or 184, as well as the eruption of the retaining member 112 into the slot 190, causes the base to be in a fixed relation relative to the side rail in all directions except axially along the side rail. That is, the only freedom of movement of the base 100 relative to the side rail is lengthwise sliding movement. By pulling on the retaining block, which effects a retraction of the retaining member, the base may be laterally removed from the side rail.

As can best be seen from FIGS. 8 and 10, the decrimping operation is accomplished by placing the decrimping tool 124 onto one of the side rails by mounting the base in the aforesaid manner. The decrimping tool is then slid to a position immediately facing a tab 94 to be decrimped. The handles 130 and 142 are separated and held in one hand by the repairman. The hook edge 148 is positioned to abut the tip 98 of the tab. The repairman then executes a rotary motion of the handle 130 along arrow A while squeezing handle 142 in the direction of arrow B with his fingers. The result of the aforesaid combined rotary and squeezing action results in bending the tab from a crimped position shown in FIG. 8 to an upstanding position in FIG. 10. The decrimping tool is then slid along the side rail to the next tab to be decrimped, where the operation therefor is identical to that just described. As can best be seen from FIG. 11, crimping is accomplished by placing the crimping tool 150 onto the side rail by mounting the base thereto as described hereinabove. The crimping tool is then slid to a position immediately facing a tab 94 to be crimped. The repairman grabs the handle 156 and positions the crimping edge 166 to abut the tab. If necessary to achieve this, the adjusting mechanism 170 is used, by rotation of the knurled knob 178, to regulate the correct height of the crimping edge relative to the tab. The preferred height is just below the tip 98 of the tab. The repairman then executes a rotary motion of the handle along arrow C until the tab is firmly crimped along the flange 96. The crimping tool is then slid along the side rail to the next tab to be crimped, where the crimping operation is identical to that just described.

It will be apparent to those skilled in the art to which this invention appertains, that the above described preferred embodiment may be subject to change or modification. Such changes or modifications can be carried out without departing from the scope of the invention which is intended to be limited only by the scope of the appended claims.

What is claimed is:

1. A decrimping tool for use in the decrimping of tabs of internal combustion engine radiators of the type including a radiator core, a header secured to said radiator core, and a tank joined to said header by a series of tabs bent over a radiator tank flange, said tabs in the crimped position extending immediately adjacent a radiator tank side wall, said radiator tank side wall extending generally normally to said radiator tank flange, said decrimping tool comprising:

a pair of mutually parallel side rails, each of said side rails having a top surface, a mutually facing surface and an outfacing surface, each of said side rails further having a shouldered recess at the juxtaposition of said mutually facing surface with said top surface;

a rail projection member attached to said outfacing side of each of said side rails, said rail projection member having a slot along its length;

a generally U-shaped base portion defining a cavity, said cavity being structured to receive said rail projection member, said U-shape base portion having a clevis attached thereto;

a retaining member retractably mounted to said U-shaped base portion, said retaining member projecting into said cavity, said retaining member further being structured to be receivable by said slot in said rail projection member of each said side rails;

means for biasing said retaining member in a direction toward said cavity;

means for selectively retracting said retaining member from said cavity;

a primary block having a first end and a second end, said primary block being pivotably attached at said first end thereof to said clevis, said primary block having at said second end thereof a first handle, said primary block further having a secondary block pedestal attached thereto adjacent said first handle;

a secondary block having a first end and a second end, said secondary block being pivotably attached to said secondary block pedestal, said secondary block having a first portion and a secondary portion mutually oriented at substantially 90° to each other, said secondary block having a channel for insertion of said secondary block pedestal thereinto and for insertion of said first handle therethrough, said secondary block further having a second handle attached to said second portion at said first end of said secondary block; and a hook finger attached to said first portion of said secondary block at said second end of said secondary block for abutting a tip of said tab;

whereby said tab is decrimped using said decrimping tool when said header is received in said shouldered recess of each said side rail, said rail projection member is received by said cavity, and said retaining member is received by said slot, said decrimping of tabs being accomplished by a simultaneous rotary motion applied to said first handle and a squeezing action applied to said second handle.

2. The decrimping took of claim 1, wherein said means for selectively retracting includes a retaining block attached to said retaining member.

3. The decrimping tool of claim 2, wherein said pair of mutually parallel side rails forms a first set of side rails, said first set of side rails being supported by fixturing for recoring of both soldered and crimped tank radiators of the type including a header and a tank either soldered or crimped thereto, said fixturing comprising:

a support frame adapted to be positioned upright on a supporting surface;

clamping fixturing suspended from said support frame, said clamping fixturing comprising first and second sets of rails alternately assembled on said support frame for conducting recoring of soldered or crimped tank radiators respectively, each of said sets of rails extending parallel to each other when assembled on said support frame for swinging adjustment movement towards and away from each other, each of said pair of rails of said second set being configured with a recess extending along each of the adjacent side and top rail surfaces to enable said rails to receive radiator headers within each of said recesses of said rails; and actuator means adjacent said clamping fixturing including a fluid pressure cylinder having an actuator rod extendable, upon pressurization of said fluid pressure cylinder, downwardly into proximity with said tank radiators disposed on said rails, and further including hold down elements drivingly connected to said actuator rod to engage the upper surfaces of said radiator tank and thereby enable the holding pressure to be exerted thereon by pressurization of said fluid pressure cylinder, said actuator means further comprising means for selectively pressurizing said fluid pressure cylinder to extend said actuator rod.

4. A crimping tool for use in the crimping of tabs of internal combustion engine radiators of the type including a radiator core, a header secured to said radiator core, and a tank joined to said header by a series of tabs bent over a radiator tank flange, said tabs in an upstanding position extending immediately adjacent a radiator tank side wall, said radiator tank side wall extending generally normally to said radiator tank flange, said crimping tool comprising:

a pair of mutually parallel side rails, each of said side rails having a top surface, a mutually facing surface and on outfacing surface, each of said side rails having a shouldered recess at the juxtaposition of said mutually facing surface with said top surface;

a rail projection member attached to said outfacing surface of each of said side rails, said rail projection member having a slot along its length;

a U-shaped base portion defining a cavity, said cavity being structured to receive said rail projection member, said U-shaped base portion having a base clevis attached thereto;

a retaining member retractably mounted to said U-shaped base portion, said retaining member projecting into said cavity, said retaining member further being structured to be receivable by said slot;

means for biasing said retaining member towards said cavity;

means for selectively retracting said retaining member from said cavity;

a main block having a first and second end, said main block being pivotably attached at said first end thereof to said base clevis, said main block having at said second end thereof a handle, said main block further having a crimping finger clevis;

a crimping finger having a first and second end, said crimping finger being pivotably attached at said first end thereof to said crimping finger clevis, said crimping finger having a crimp edge at said second end thereof; and means for positionally adjusting said crimp edge in position to said main block so that said crimp edge may abut said tab;

whereby said tab is crimped using said crimping tool when said header is received in said shouldered recess of each said side rail, said rail projection member is received by said cavity, and said retaining member is received by said slot, said crimping of tabs being accomplished by a rotary motion applied to said handle toward said header.

5. The crimping tool of claim 4, wherein said means for selectively retracting includes a retaining block attached to said retaining member.

6. The crimping tool of claim 4, wherein said crimping finger has an aperture and said means for positionally adjusting comprises:

a threaded rod attached to said main block, said threaded rod passing through said aperture and said crimping finger;

a spring trapped between said main block and said crimping finger, said spring biasing said crimping finger away from said main block; and a knurled knob threadingly received on said threaded rod.

7. The crimping tool of claim 6, wherein said pair of mutually parallel side rails form a first set of side rails, said first set of side rails being supported by fixturing for recoring of both soldered and crimped tank radiators of the type including a header and tank either soldered or crimped thereto, said fixturing comprising:

a support frame adapted to be positioned upright on a supporting surface;

clamping fixturing suspended from said support frame, said clamping fixturing comprising first and second sets of rails alternately assembled on said support frame for conducting recoring of soldered or crimped tank radiators respectively, each of said sets of rails extending parallel to each other when assembled on said support frame for swinging adjustment movement towards and away from each other, each of said pair of rails of said second set being configured with a recess extending along each of the adjacent side and top rail surfaces to enable said rails to receive radiator headers within each of said recesses of said rails; and actuator means adjacent said clamping fixturing including a fluid pressure cylinder having an actuator rod extendable, upon pressurization of said fluid pressure cylinder, downwardly into proximity with said tank radiators disposed on said rails, and further including hold down elements drivingly connected to said actuator rod to engage the upper surfaces of said radiator tank and thereby enable the holding pressure to be exerted thereon by pressurization of said fluid pressure cylinder, said actuator means further comprising means for selectively pressurizing said fluid pressure cylinder to extend said actuator rod.

* * * * *

UNITED STATES PATENT AND TRADEMARK OFFICE
CERTIFICATE OF CORRECTION

PATENT NO. : 4,823,455
DATED : April 25, 1989
INVENTOR(S) : Richard Desiro

It is certified that error appears in the above-identified patent and that said Letters Patent is hereby corrected as shown below:

Column 4, line 2, delete "ma" and insert ---- may ----.

<u>In the Claims</u>

Column 11, line 36, delete "took" and insert ---- tool ----.

Signed and Sealed this

Tenth Day of July, 1990

*Attest:*

HARRY F. MANBECK, JR.

*Attesting Officer*      *Commissioner of Patents and Trademarks*